(12) United States Patent
Claypool et al.

(10) Patent No.: US 7,789,238 B2
(45) Date of Patent: Sep. 7, 2010

(54) STORAGE BIN AND LID ASSEMBLY

(75) Inventors: Christopher J. Claypool, Huntersville, NC (US); Jason E. Begin, Mooresville, NC (US)

(73) Assignee: Rubbermaid Incorporated, Huntersville, NC (US)

( * ) Notice: Subject to any disclaimer, the term of this patent is extended or adjusted under 35 U.S.C. 154(b) by 263 days.

(21) Appl. No.: 11/862,740

(22) Filed: Sep. 27, 2007

(65) Prior Publication Data

US 2009/0084786 A1  Apr. 2, 2009

(51) Int. Cl.
*B65D 21/00*  (2006.01)

(52) U.S. Cl. .................. 206/508; 220/254.9; 220/345.2; 220/351; 220/811; 220/815; 312/139.1; 312/139.2; 312/323; 312/349

(58) Field of Classification Search .................. 206/508; 220/254.9, 345.1, 345.2, 345.3, 345.4, 348; 220/351, 811–813, 815; 312/139.1, 139.2, 312/323, 349

See application file for complete search history.

(56) References Cited

U.S. PATENT DOCUMENTS

| | | | |
|---|---|---|---|
| 653,695 A | 7/1900 | Raff | |
| 1,578,819 A | 3/1926 | Freeland | |
| 1,862,609 A | 6/1932 | Shaw | |
| 2,170,311 A | 8/1939 | Smith | |
| 2,344,448 A | 3/1944 | Oakes | |
| D137,617 S | 4/1944 | Miller | |
| 2,470,463 A * | 5/1949 | Botten | 119/65 |
| 2,677,483 A | 5/1954 | Shaw | |
| 2,833,440 A | 5/1958 | Oehler et al. | |
| 3,347,394 A | 10/1967 | Gould | |
| 3,851,860 A | 12/1974 | Smith | |
| 4,162,024 A | 7/1979 | Shanley | |
| 4,260,069 A | 4/1981 | Juergens | |
| 4,744,487 A | 5/1988 | Welborn | |
| D311,799 S | 10/1990 | Embree et al. | |
| 5,271,515 A | 12/1993 | Berkheimer et al. | |
| 5,593,037 A | 1/1997 | Ohayon | |
| D378,636 S | 4/1997 | Chrisco | |
| 5,673,811 A | 10/1997 | Dickinson et al. | |
| D429,882 S | 8/2000 | Lee et al. | |

(Continued)

OTHER PUBLICATIONS

Cambro Sliding Lids for Boxes, Cambro Manufacturing Company, obtained from http://cool.cambro.com; 4 pages; admitted prior art.

(Continued)

*Primary Examiner*—Anthony Stashick
*Assistant Examiner*—Elizabeth Volz
(74) *Attorney, Agent, or Firm*—Lempia Braidwood LLC

(57) ABSTRACT

A storage bin assembly has a container base with a front, a back, a bottom, a perimeter side wall extending up from the bottom, and a storage space above the bottom within the side wall. A base lid is positioned over a top of the storage space. An access opening into the storage space is positioned near the front of the container base. A cover is selectively movable relative to the lid between a closed position closing off the access opening and two optional open positions. One of the positions is a rear position rearward of the access opening and the other of the positions is a front position forward of the access opening. Each optional open position exposes the storage space through the access opening.

21 Claims, 9 Drawing Sheets

U.S. PATENT DOCUMENTS

| | | |
|---|---|---|
| D432,869 S | 10/2000 | Saunders |
| D515,313 S | 2/2006 | Uffner et al. |
| 2006/0124653 A1* | 6/2006 | McRorie, III ............... 220/735 |
| 2008/0079278 A1* | 4/2008 | Rajappa et al. .......... 296/24.34 |

OTHER PUBLICATIONS

Access Mates Large Storage Container, Tupperware; obtained from www.tupperware.com; 1 pages; admitted prior art.

Mobile Double-Sided Louvered Rack; Flexconbins, obtained from www.flexconbins.com; 2 pages; admitted prior art.

Stackbin Storage Systems, Stackbins, obtained from www.stackbin.com; 3 pages; admitted prior art.

Stak-N-Store Bin, Akron-Mils, obtained from www.qnsdistributors.com; 3 pages; admitted prior art.

www.bostonrack.com; one image; 1 page; admitted prior art.

Workingtainer, Cisco-Eagle, obtained from http://catalog.cisco-eagle.com; 2 pages; admitted prior art.

Stack-N-Store Stackable Storage Bin, obtained from www.jefferspet.com; 2 pages; admitted prior art.

* cited by examiner

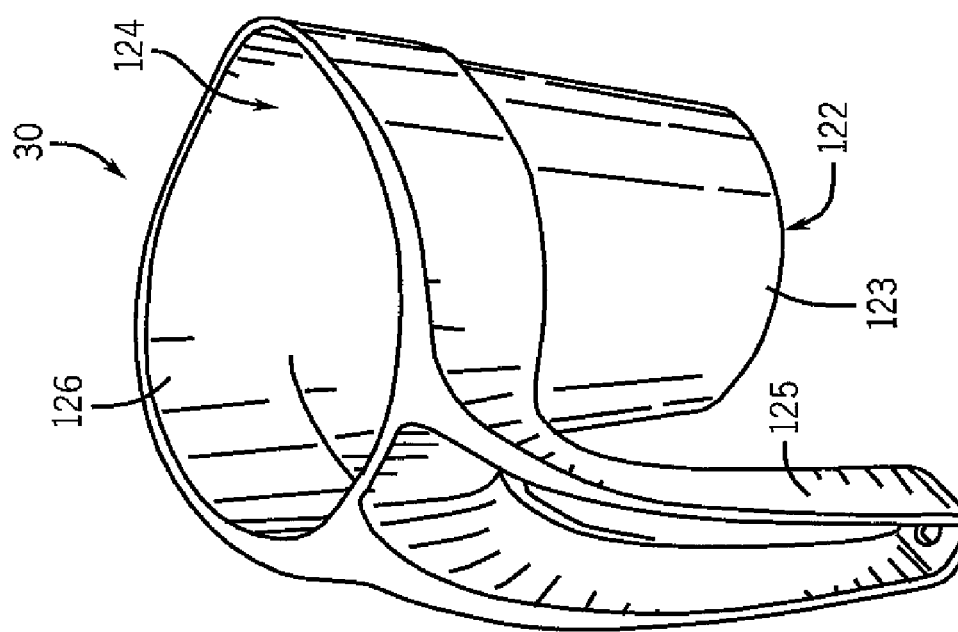
FIG. 7
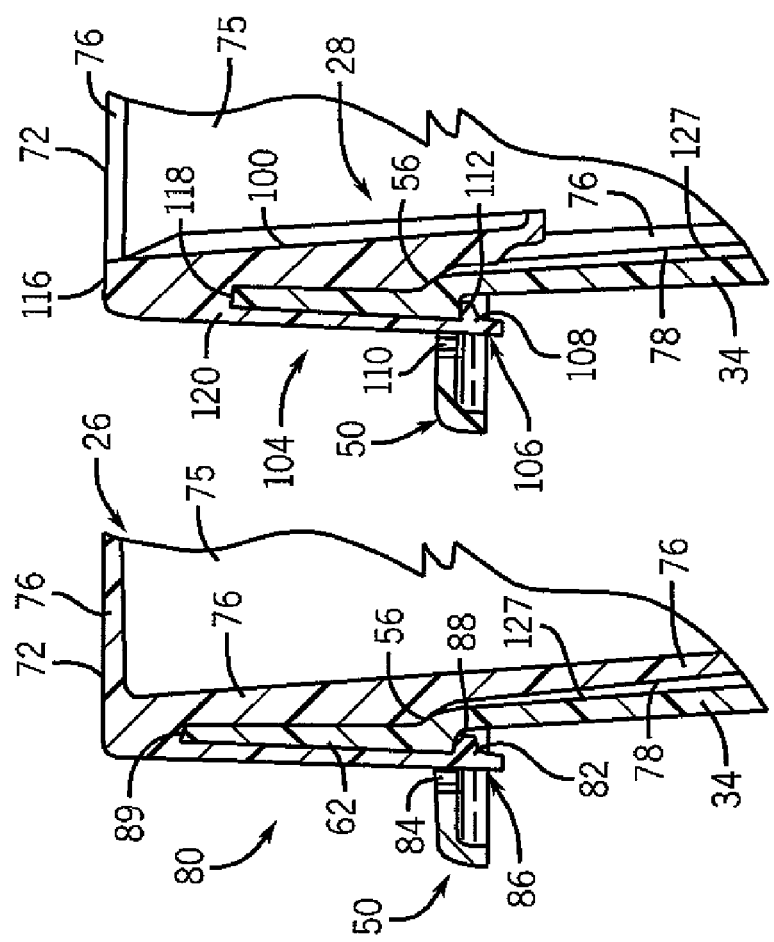
FIG. 5
FIG. 4

STORAGE BIN AND LID ASSEMBLY

BACKGROUND OF THE INVENTION

1. Field of the Disclosure

The present disclosure is generally directed to storage bins, and more particularly to a storage bin and lid assembly reconfigurable between several different arrangements.

2. Description of Related Art

Storage containers such as food ingredient bins are known in the art. These bins are typically relatively large in size and include a container base with a bottom, a side wall, and a lid covering an open top of the base. The lid typically includes a cover near a front of the storage bin that can be pivotally opened in an upward and rearward direction permitting access into a storage space of the bin to remove food ingredients. The entire lid can typically be removed to open the top of the container base to refill the storage space with food ingredients or the like.

Commercial kitchens often employ a number of these types of food ingredient bins, as do grocery stores, for storing food ingredients in bulk. The bins are relatively large in size and take up a lot of space. Additionally, a scoop is often left sitting on or standing in the ingredients within the bin for repeated use and accessibility to remove quantities of the food ingredient. In a conventional food ingredient bin of this type, the scoop is typically left partially submerged in the food ingredients with the handle extending upward. A user can access the scoop by grabbing the exposed handle for use. Sometimes, the scoop is left lying on top of the food ingredients and thus the handle is close to or resting on the ingredients. To remove the scoop, the user must grab the handle and in doing so may touch the food ingredients with their hand. This can contaminate the ingredients remaining in the bin or being scooped from the bin by the user.

Additionally, the scoop sometimes may be poorly positioned in the food ingredients and difficult to grasp. Sometimes, a low level of food ingredients requires a user to reach deep into the ingredient bin to access the scoop to remove ingredients. The user again can accidentally contact the ingredients with their hand or arm and potentially contaminate the contents of the bin.

In a commercial kitchen environment, the staff may sometimes stack ingredient bins to reduce the amount of space needed for the bins. Stacking the bins makes it difficult or impossible to open the covers of the ingredient bins in order to access the ingredients. Thus, when a lower bin in a stack of bins is required for use, the bins must be unstacked to access the ingredients of such a bin within the stack. Alternatively, some ingredient bins may be provided with pivotable lids that can be raised at least somewhat in order to expose the opening under the cover. However, it is difficult or impossible to reach into such a bin with the cover only partly opened. Also, a user must use one hand to hold the lid of the stacked bin while removing food ingredients with their other hand because the partly opened lid won't stay open on its own. Otherwise, the lid will simply fall on their hand making it even more difficult to remove food ingredients from a bin in the stacked bin configuration. Thus, even if the opening is accessible, it can be cumbersome to remove ingredients. Ingredient bins are typically not configured to be used in a stacked manner. Some ingredient bins have a cover on the lid that slides open to the rear. This type of cover will not function at all if the bin is stacked under another bin.

Food ingredients within a storage bin of this type often can spill out of the container when ingredients are being removed using a scoop. Some ingredient bins have an opening under the cover that is angled or tilted forward. When such a bin is full, food ingredients sometimes will spill out when an individual reaches into the container to scoop out ingredients. This can occur even when the bin is less than full because the food ingredients will likely be pushed by a user toward the front opening during use for easier access.

BRIEF DESCRIPTION OF THE DRAWINGS

Objects, features, and advantages of the present invention will become apparent upon reading the following description in conjunction with the drawing figures, in which:

FIG. 4 shows a cross-section of part of the storage bin and partition wall taken along line IV-IV in FIG. 3.

FIG. 5 shows a cross-section of the scoop hook in FIG. 3 after installation on the container base and taken along line V-V.

FIG. 7 shows an enlarged perspective view of one example of a scoop suitable for use with the storage bin of FIG. 1.

DETAILED DESCRIPTION OF THE DISCLOSURE

The storage bin assembly disclosed and described herein solves or improves upon one or more of the above-noted and other problems and disadvantages with prior known storage bins of this type. In one example, the disclosed storage bin assembly incorporates a dual-open position cover as a part of its lid assembly. The cover can move to an open position in either a rearward direction or a forward direction. In the forward open position, the cover is positioned at a front of the bin and permits access to the interior of the bin to remove contents. In one example, the disclosed dual-open position cover arrangement is useful for vertically stacking two or more like bins and yet permitting full access to the interior of any one of the bins without having to unstack the bins.

In another example, a scoop is presented for ready access within the interior of the bin. The scoop is suspended from a side of the bin interior so that it is out of the way of the access opening and does not touch the bin contents. While suspended, the scoop is however positioned for easy grasping when needed. In another example, a partition wall is provided within the interior of the bin. The wall can be removed and inserted easily allowing a user to determine whether or not the partition wall is to be used. In one example, the partition wall has a height that is less that the height of the bin interior leaving a gap between the partition and the bottom of the container base. The gap permits ingredients to pass below the partition wall within the interior of the bin. The ingredients will, at least to some degree, self level, which permits the bin to be filled from the back side of the partition wall. Doing so can assist in controlling and/or the level of the ingredients at the front part of the partition and in turn reduce spilling during filling and when removing the bin contents.

Figure 1:
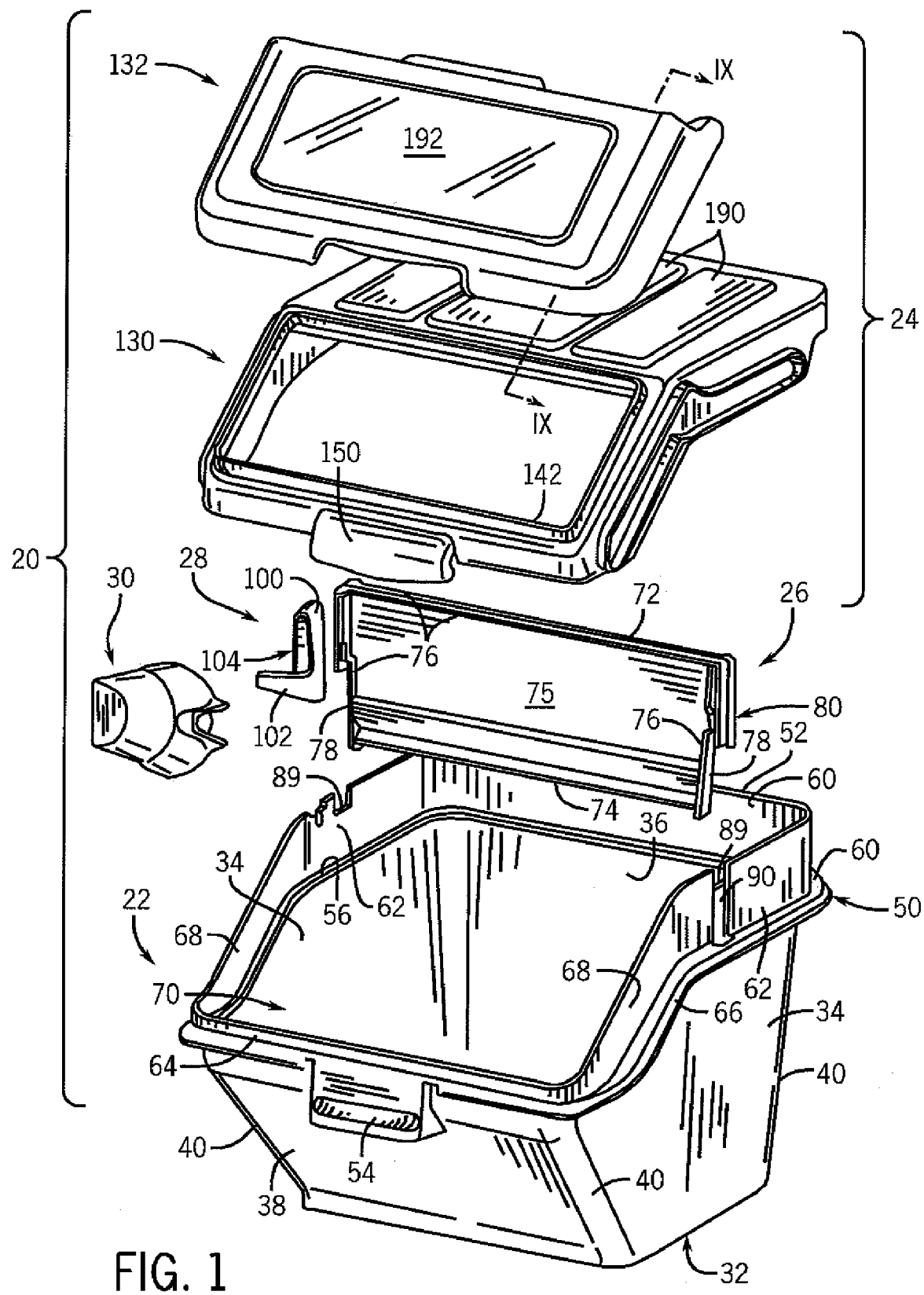
FIG. 1 shows an exploded view of a storage bin constructed in accordance with the teachings of the present invention.
Figure 2:
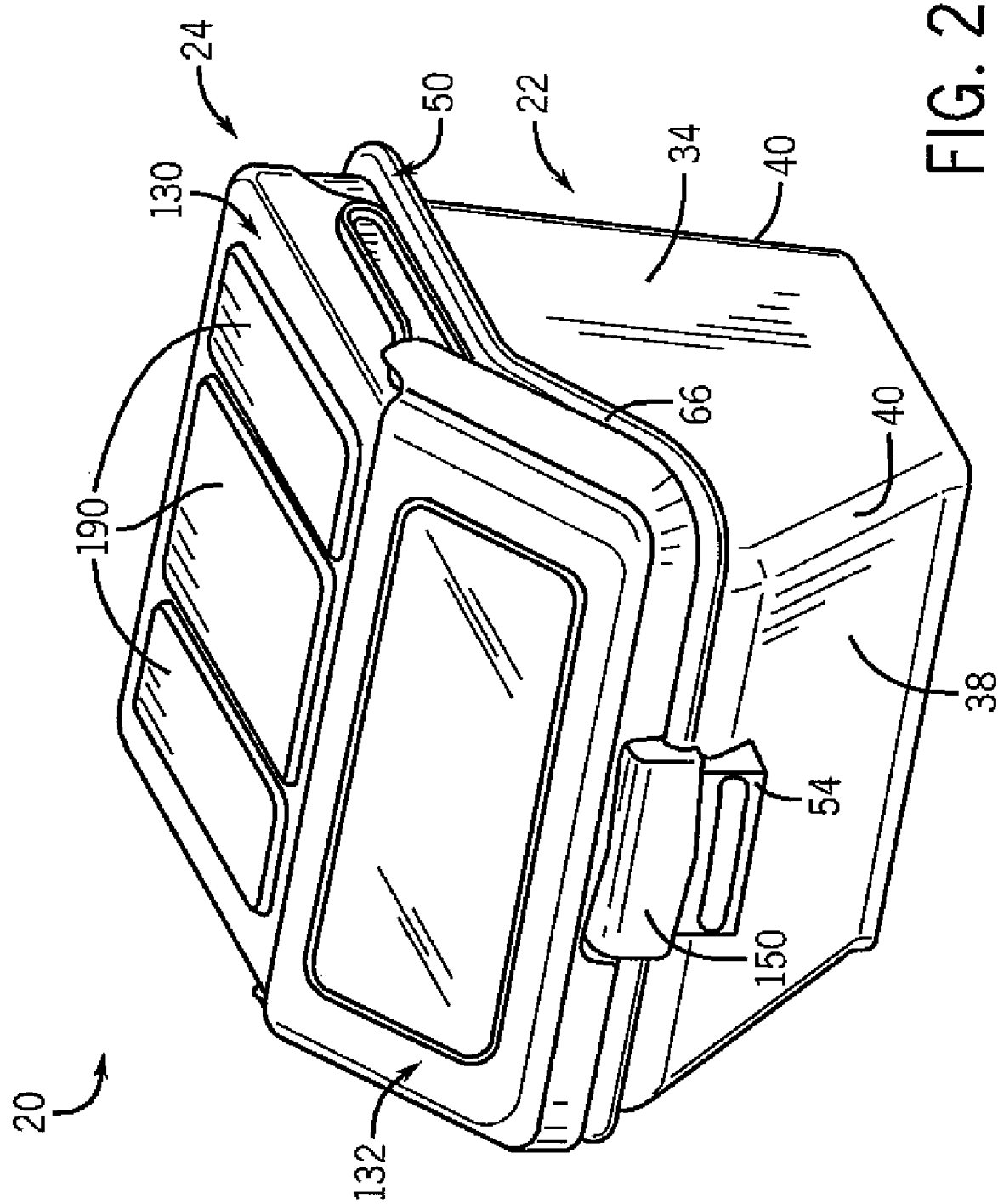
FIG. 2 shows the storage bin of FIG. 1 in an assembled and closed configuration.

Turning now to the drawings, FIG. 1 shows an exploded view of a storage bin 20 constructed in accordance with one example of the teachings of the present invention. FIG. 2 shows the assembled bin 20 in a closed configuration. The disclosed storage bin 20 generally includes a container base 22, a lid assembly 24 for the base, a removable partition wall 26, a scoop hook 28, and a scoop 30.

The container base 22 has a bottom 32 (see FIG. 6) and an upstanding side wall extending upward from a perimeter of the bottom. In the disclosed example, the side wall includes a pair of opposed sides 34, a back 36, and a front 38. In this example, the bottom 32 is generally planer and the sides 34 and back 36 are also generally flat and extend vertically upward from the perimeter of the bottom. The bottom and side wall form a somewhat rectangular cylinder shape in this example. As will be evident to those having ordinary skill in the art, the overall shape of the base 22 can vary and yet fall within the spirit and scope of the present invention.

A slight outward draft on the sides 34 and back 36 can be incorporated to assist in creating the product using a well known process such as injection molding or the like. The front 38 in the disclosed example is angled or tilted forward from a vertical reference as it moves up from the bottom perimeter. The back 36 and front 38 are joined to the sides 34 at rounded corners 40 of the base in this example. A rim 50 extends around a perimeter of the side wall near a top edge 52 of the base 22. In this example, the rim 50 projects radially outward from the side wall. An optional handle 54 projects forward from the front 38 at about a mid-point of the front and at a position below the rim 50. In this example, the handle 54 is undercut or hollow from below. The handle 54 on the front 38 and the rim 50 on the back 36 can be used to carry and/or maneuver the storage bin 20. As will be evident to those having skill in the art, the position, size, configuration, and even presence of the rim 50 as well as the handle 54 can also vary within the spirit and scope of the invention.

An upper section of the side wall projects upward above the rim 50 around the perimeter of the base 22. In this example, the upper section has a rear section 60 that is above the rim 50 as part of the back 36. Side sections 62 of the upper section extend upward above the rim 50 on the sides 34 of the base. A front section 64 extends upward from the rim 50 on the front 28 of the base. As can be seen in FIG. 1, the upper sections 60, 62, and 64 terminate at the top edge 52 of the side wall above the rim 50. In the disclosed example, the back 36 is taller than the front 38 and the rear section 60 is also substantially taller than the front section 64. The side sections 62 coincide in height with the rear top portion 60 near the back 36 of the base. The height of the sides 34 gradually decreases from back to front in the disclosed storage bin 20. As shown in FIG. 1, the sides 34 closer to the back 36 are of essentially the same height as the back. The rim around these portions of the sides 34 and back 36 is generally horizontally oriented. The height of the sides 34 begins to decrease towards the front 38 of the container base 22 in the disclosed example. Part of the rim 50 and part of the side sections 62 including the top edge 52 angle downward from the maximum side wall height to the lower height near the front 38. An inclined rim section 66 and an inclined section 68 of the upper side sections 62 are also angled downward toward the front 38 to provide the transition between the maximum height of the side wall near the back 36 and the lower height of the side wall at the front 38.

As shown in the drawings, and particularly in FIGS. 1, 3, and 4, the upper section of the side wall is stepped radially outward relative to the side wall below the rim 50. An outward step 56 is thus formed in this example. This step need not be present within the spirit and scope of the present invention.

As shown in FIG. 1, the container base 22 includes an open top defined within the top edge 52 of the side wall. The open top opens into an interior storage space 70 within the base 22. The storage space 70 is defined above the bottom 32 and within the sides 34, back 36, and front 38 of the base. As shown in FIGS. 1 and 3, the partition wall 26 includes a top edge 72, a bottom edge 74, a wall panel 75, a perimeter bead or flange around the panel, and a pair of side edges 78. The bead or flange 76 in this example can be provided to give additional rigidity and strength to the partition wall 26 while allowing a relatively thin wall panel 75. This can permit less material usage and provide weight reduction if desired.

An attachment clip 80 is provided on each of the side edges 78 of the partition wall 26 in this example. Each attachment clip 80 in the disclosed example is formed as a resilient flexible finger extending downward along and spaced from a respective one of the side edges 78. The finger or attachment clip 80 in the disclosed example is integrally molded or formed as a part of the side edges 78 on the partition wall 26. As shown in FIG. 4, the attachment clips 80 each have a lower end 86 with a protrusion 82 that extends back toward the respective side edge 78. A hole 84 is provided downward through the rim 50 on each side 34 of the base 22. The holes 84 are located at the attachment points for the partition wall 26.

An undercut or shelf 88 is provided toward each side 34 below the rim 50 at the location of each hole 84 (see FIG. 4). As shown in FIG. 1, a notch 89 is provided down into the top edge 52 of each side section 62 on the sides 34. Also as shown in FIG. 2, a vertical recess or inset channel 90 can be provided into the outer surface of each side section 62. The notches 89 and recesses 90 are also located at the attachment points for the wall 26 and in this example are vertically aligned with the holes 84. To install the partition wall 26, the wall is positioned with the clips 80 above the notches 89. The wall 26 is pushed down onto the sides 34 with the side sections 62 fitted between the clips 80 and the side edges 78 of the wall. When installed, the protrusion 82 on each side of the partition wall 26 snaps via resiliency of the clip 80 under the shelf 88 to secure the partition wall 26 in place. The notches 89 permit the partition wall 26 to drop down so that its top edge 72 is level or flush with the top edge 52 of the side walls. The recesses 90 permit the outer surface of the clips 80 to lie generally flush with the outer surface of the side sections 62 as well. To remove the partition wall 26, a user can simply raise the partition wall 26 applying enough force to allow the protrusions 82 to snap back out from under of the undercuts 88 and upward through the holes 84 as permitted by the resilient nature of the clips 80.

As noted above, the partition wall 26 has a height from its top edge 72 to its bottom edge 74 that is less than a height of the interior storage space 70 as shown in FIG. 4. When installed, a gap 94 is created between the bottom edge 74 of the partition wall and the bottom 32 of the container base 22. The partition wall 26 is selectively removable permitting a user to deploy the partition wall or remove the partition wall as desired or when needed for a particular food ingredient application. The truncated height of the partition wall 26 in the disclosed example permits food ingredients to be added to the interior storage space 70 between the partition wall and the back 36 of the base. The food ingredients can flow via the gap 94 underneath the partition wall 26 to the storage space region between the partition wall and the front 38 of the base. This can assist in controlling the level of food ingredients or other contents that flow to the front of the container as is described in greater detail below.

Figure 3:
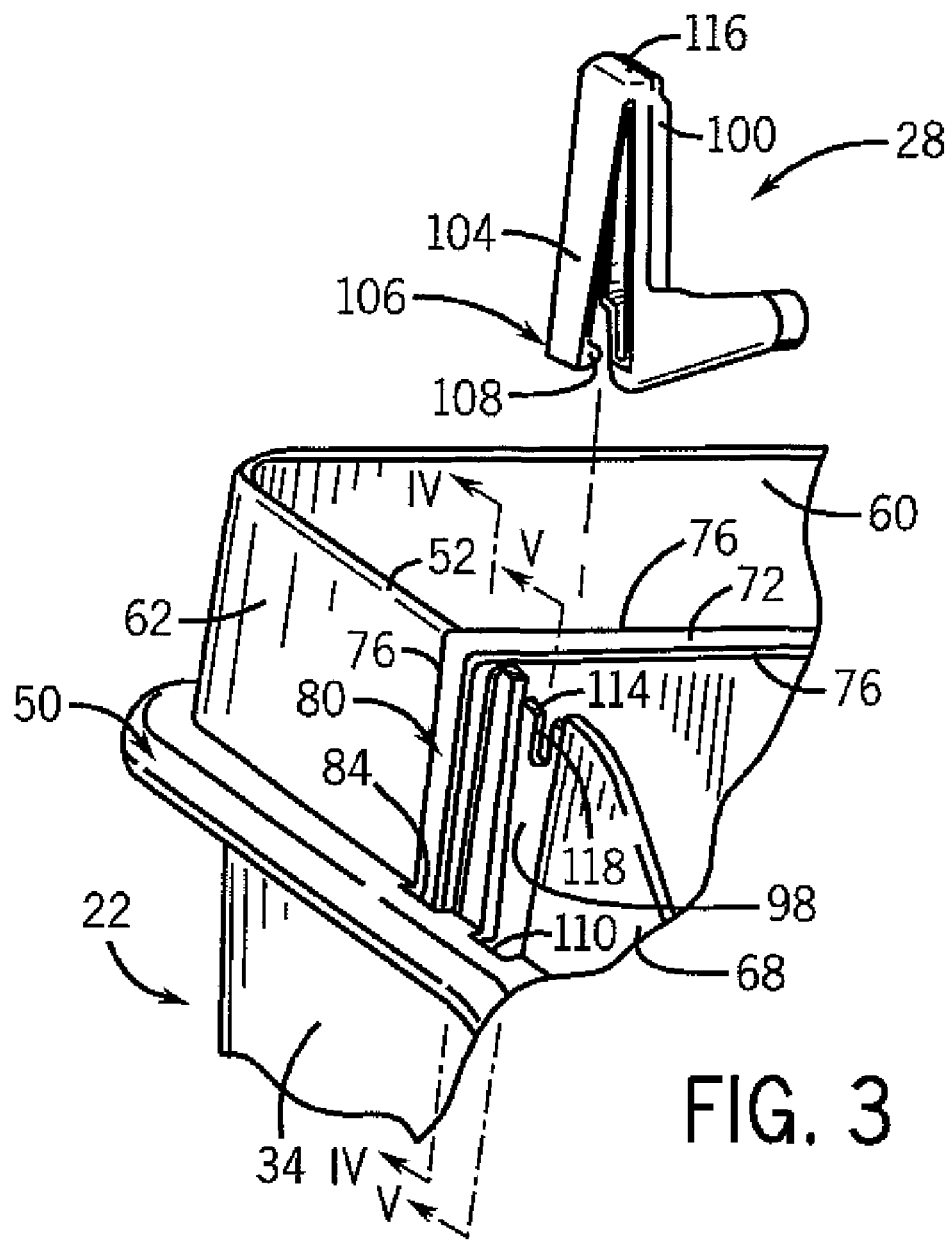
FIG. 3 shows an enlarged perspective view of a portion of the assembled partition wall and container base of the storage bin shown in FIG. 1 and shows a scoop hook exploded from the base.

FIG. 3 illustrates an enlarged view of the scoop hook 28 prior to assembly to the container base 22. As shown, the scoop hook 28 includes a body 100, a forward projecting leg 102, and a downward projecting clip 104. In the disclosed example, the clip 104 is essentially L identical to the wall clips 80 previously described. Thus, the clip 104 is a resilient finger projecting downward and spaced from the body 100 and has a lower end 106 with a protrusion 108 that extends back toward the body. As shown in FIGS. 4 and 5, a hole 110 is again provided in the rim 50 at the mounting location for the scoop hook 28. An undercut 112 is formed toward the side 34 beneath the rim. The scoop hook 28 is installed by lowering the hook onto the side 34 with the side section 62 positioned between the clip 104 and the body 100 and dropping the scoop hook 28 down until the protrusion 108 snaps beneath the undercut 112 to secure the scoop hook in place. The leg 102 extends forward parallel to the side 34 and is spaced slightly inward from the interior surface of the side to accept the scoop 30 thereon.

As shown in FIGS. 1 and 3, a notch 114 can be formed in the top edge 52 of the side 34 on which the scoop hook 28 is mounted. Thus, a top end 116 of the scoop hook 28 can drop to a level flush with the top edge 52 in the same manner as described previously with respect to the partition wall 26. An open ended slot 118 is formed in the disclosed example dropping further below a level of the notch 114. A protruding guide 120 can be provided extending downward from the connection between the leg 102 and body 100. The guide 120 can be configured to slide downward and fit into the slot 118 when the scoop hook 28 is attached to the base 22. The slot and guide arrangement can be provided to help secure and retain the scoop hook 28 in place when the scoop 30 is removed from or installed on the leg 102, which may otherwise cause the upper end of the clip to move forward or rearward and inadvertently release. Also as shown in FIG. 3, a vertical channel or inset 98 can also be provided into the outer surface of the side section 62 that aligns with the clip 104. This again can allow the clip 104 to lie flush with the side section when installed.

Figure 6:
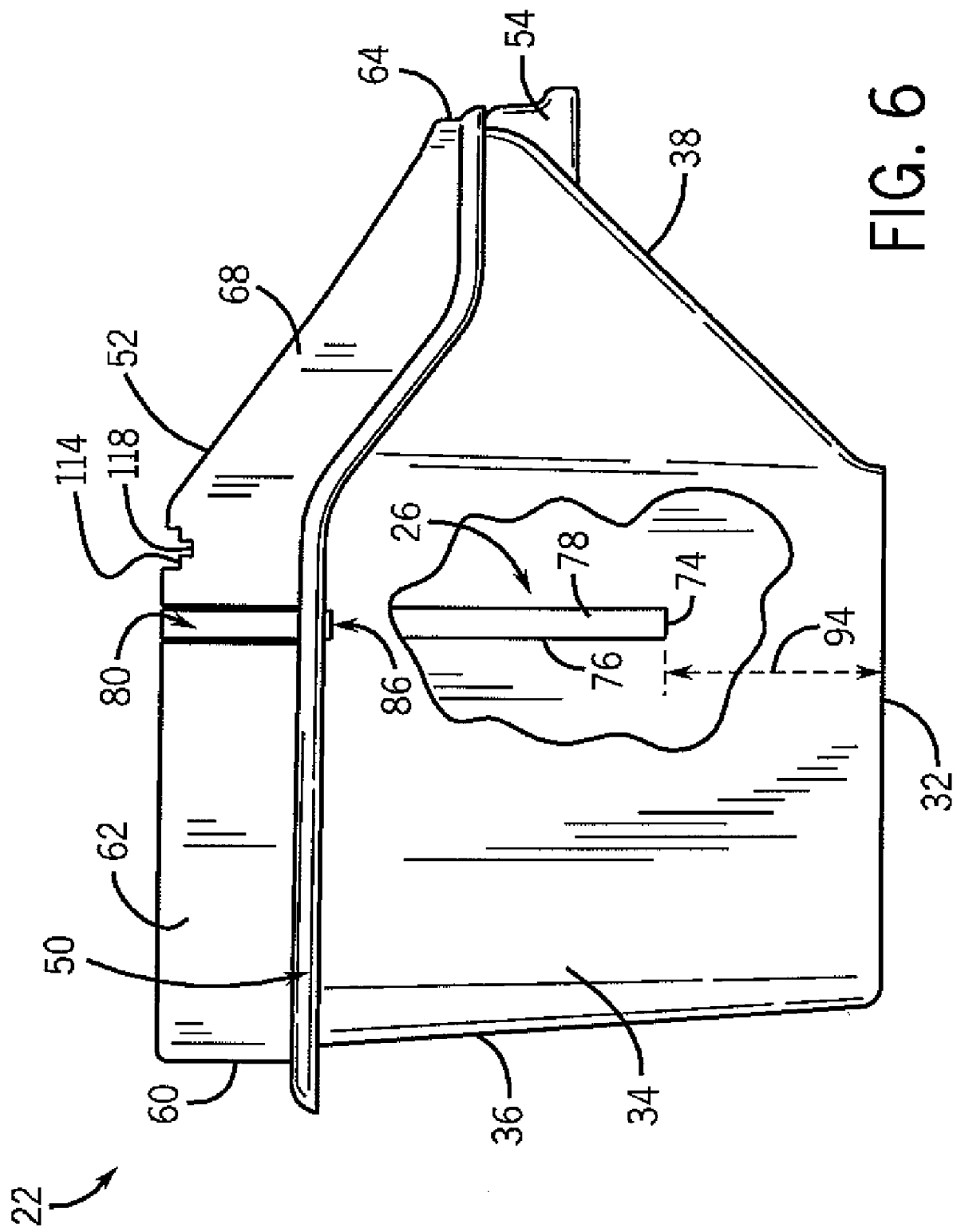
FIG. 6 shows a cut-away side view of the assembled partition wall and container base of FIG. 3.

As shown in FIGS. 1 and 7, the scoop 30 generally has a bottom 122, a side wall 123 extending up from the bottom perimeter, a scoop interior 124, and a handle 125 extending outward and parallel to the side wall. In this example, the scoop 30 includes one generally flat side 126 on the side wall 123 opposite the handle 125. As illustrated in FIGS. 1 and 6, the leg 102 of the scoop hook 28 extends forward and is spaced inward from an inner surface 127 of one of the sides 34 on the container base. The flat side 126 of the scoop 30 is configured to slide between the leg 102 and the inner surface 127 of the side 34. The scoop 30 hangs from the leg 102 with the flat side 126 laying against the surface 127. The scoop 30 in this example is the subject of a pending U.S. patent application Ser. No. 11/567,935, which is assigned to the assignee of the present invention, and the entire contents of which are incorporated herein by reference.

As shown in FIG. 1, the lid assembly 24 in the disclosed example has two components including a base lid 130 and a movable cover 132. The base lid 130 is configured to fit over the top opening of the container base 22. The base lid 130 includes a generally horizontal top panel section 134 positioned near a back edge 136 of the base lid and a depending perimeter skirt 138. The base lid 130 also includes a front section 140 that has a large access opening 142. The access opening 142 is bounded by a portion of the skirt 138 that extends forward of the top panel section 134 of the lid 130. In the disclosed example, the front section 140 is sloped or angled downward moving toward a front edge 144 of the front section. Thus, sloping portions 146 of the skirt 138 and the access opening 142 are oriented at an angle relative to the top panel section of the base lid. A lid handle 150 projects forward from the skirt 138 at about a lateral midpoint of the front section 140 of the base lid 130. The lid handle 150 is undercut or hollow on its underside to provide a finger recess to grasp and manipulate the lid assembly for removal, installation, and the like.

Figure 8:
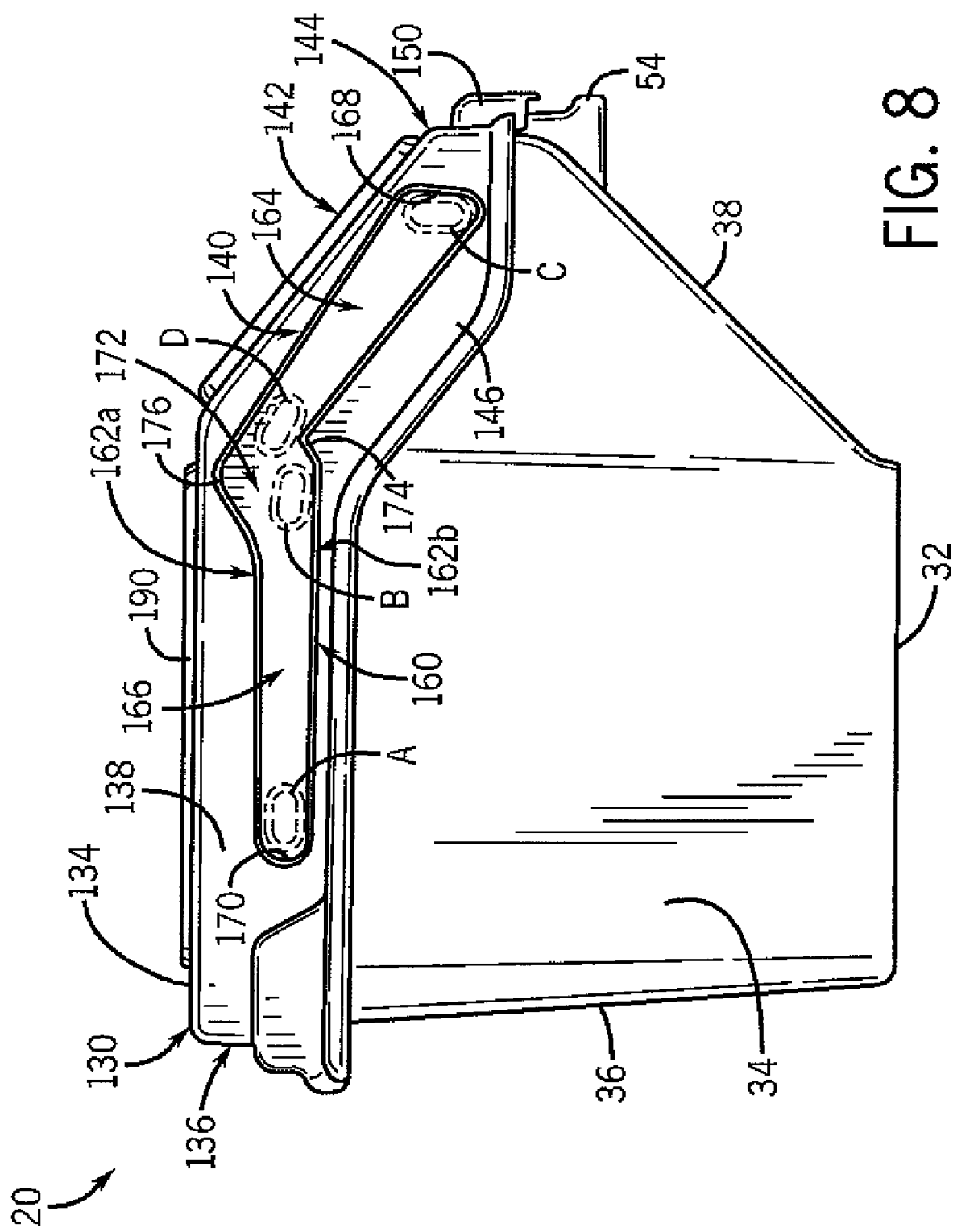
FIG. 8 shows a side view of the storage container in FIGS. 1 and 2 with the cover portion of the lid removed.

Turning now to FIG. 8, a side view of the assembled container base 22 and the base lid 130 is shown with the cover 132 removed. A track 160 is formed on each side of the skirt 138 of the base lid 130 in this example. The disclosed track 160 is formed between a pair of spaced apart and outwardly projecting ribs 162a and 162b that extend along the skirt 138. The track 160 includes a front track section 164 positioned on the skirt sloping portions 146 of the front section 140 of the base lid 130 and a rear track section 166 positioned on the skirt 138 adjacent the top panel section 134. The projecting ribs 162a and 162b are joined with one another at a forward most end defining a closed track end 168 at the front of the track 160. Similarly, the projecting ribs 162a and 162b are joined with one another at a rearward most end defining a closed rear track end 170.

Each of the tracks 160 has a transition region 172 where the front track section 164 meets the rear track section 166. The lower projecting rib 162b transitions from the rear section 166 at an upwardly ramped part 174 into the front section 164. Similarly, the upper projecting rib 162a transitions from the rear track section 166 at an upwardly ramped part 176 into the front track section 164. The ramped part 176 is positioned at generally above and spaced from the ramped part 174, but slightly rearward in this example. The transition regions 172 of the tracks 160 are provided so that the cover 132 can slide and transition from a position covering the angled access opening 142 to a position overlying the top panel section 134 of the base lid 130.

Figure 9:
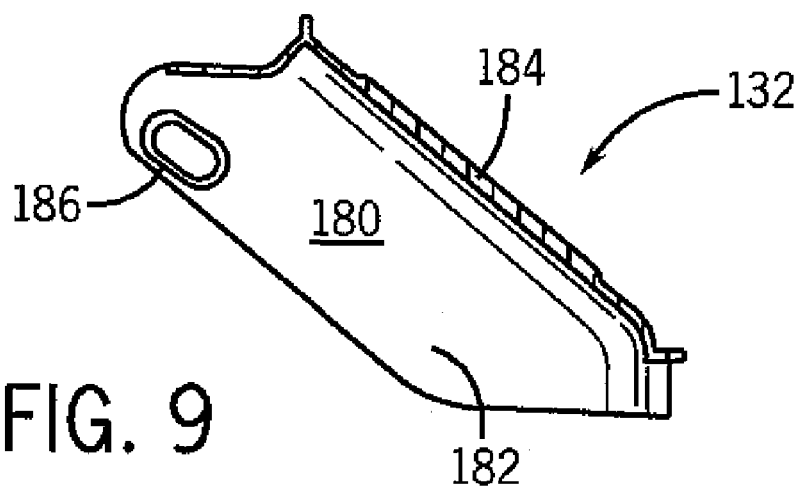
FIG. 9 shows a cross-section of the cover portion of the lid taken along line IX-IX of the lid in FIG. 1.

FIG. 9 shows a cross-section taken longitudinally along the cover 132. An interior surface 180 of a cover skirt 182 that depends from a perimeter of a cover panel 184 is thus shown. A guide projection 186 projects inward from the interior surface 180 of the skirt 182. In this example, the guide projection is formed having an oval configuration. The lengthwise dimension of the oval projection 186 is oriented parallel to the cover panel 184. Thus, the oval projection 186 will be lengthwise oriented generally parallel to the track 160 when the projection is positioned within the front track section 164 or in the rear track section 166.

Figure 10:
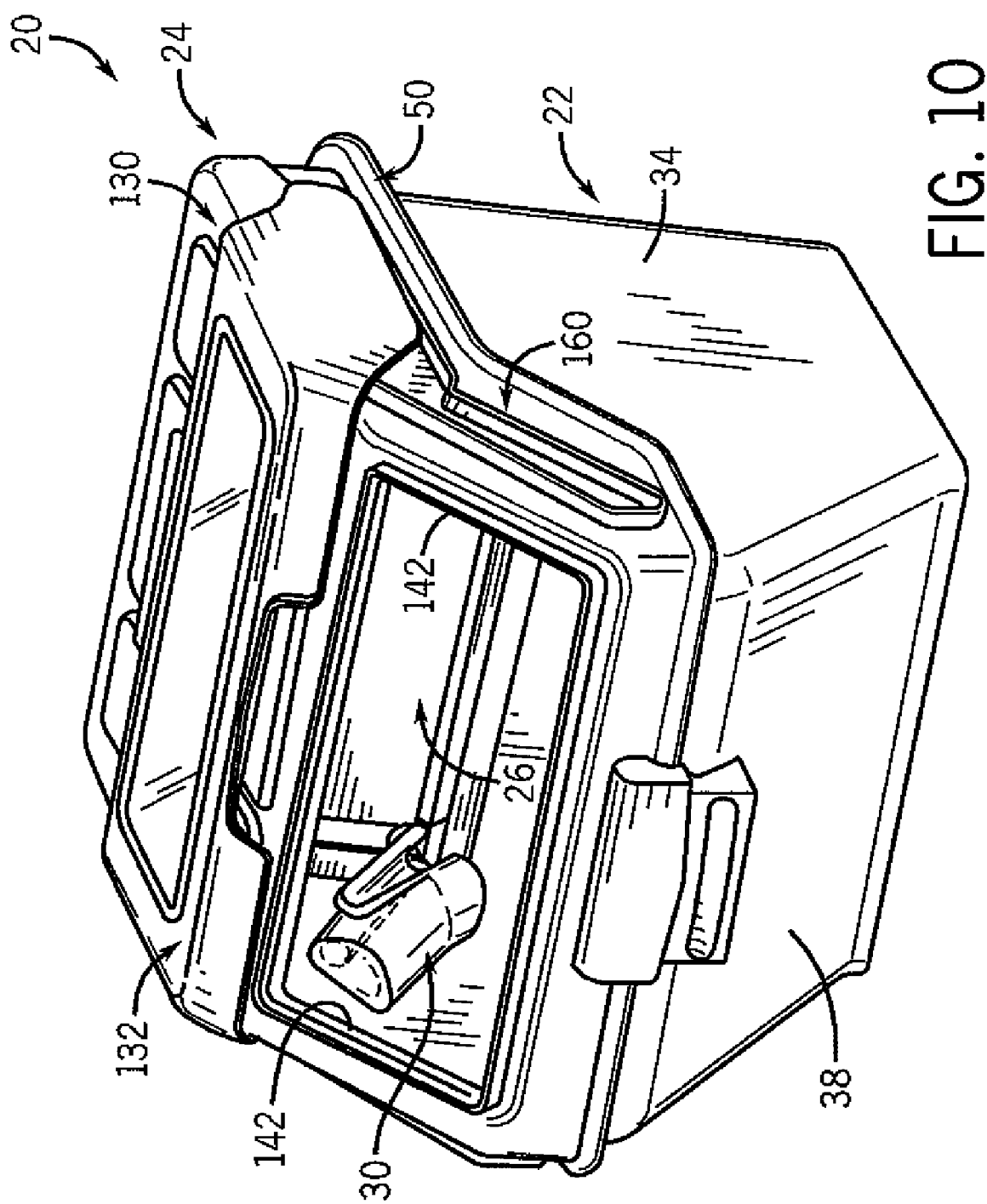
FIG. 10 shows the assembled storage bin of FIG. 2 with the cover moved to an optional rear open position permitting access to the interior of the bin.
Figure 11:
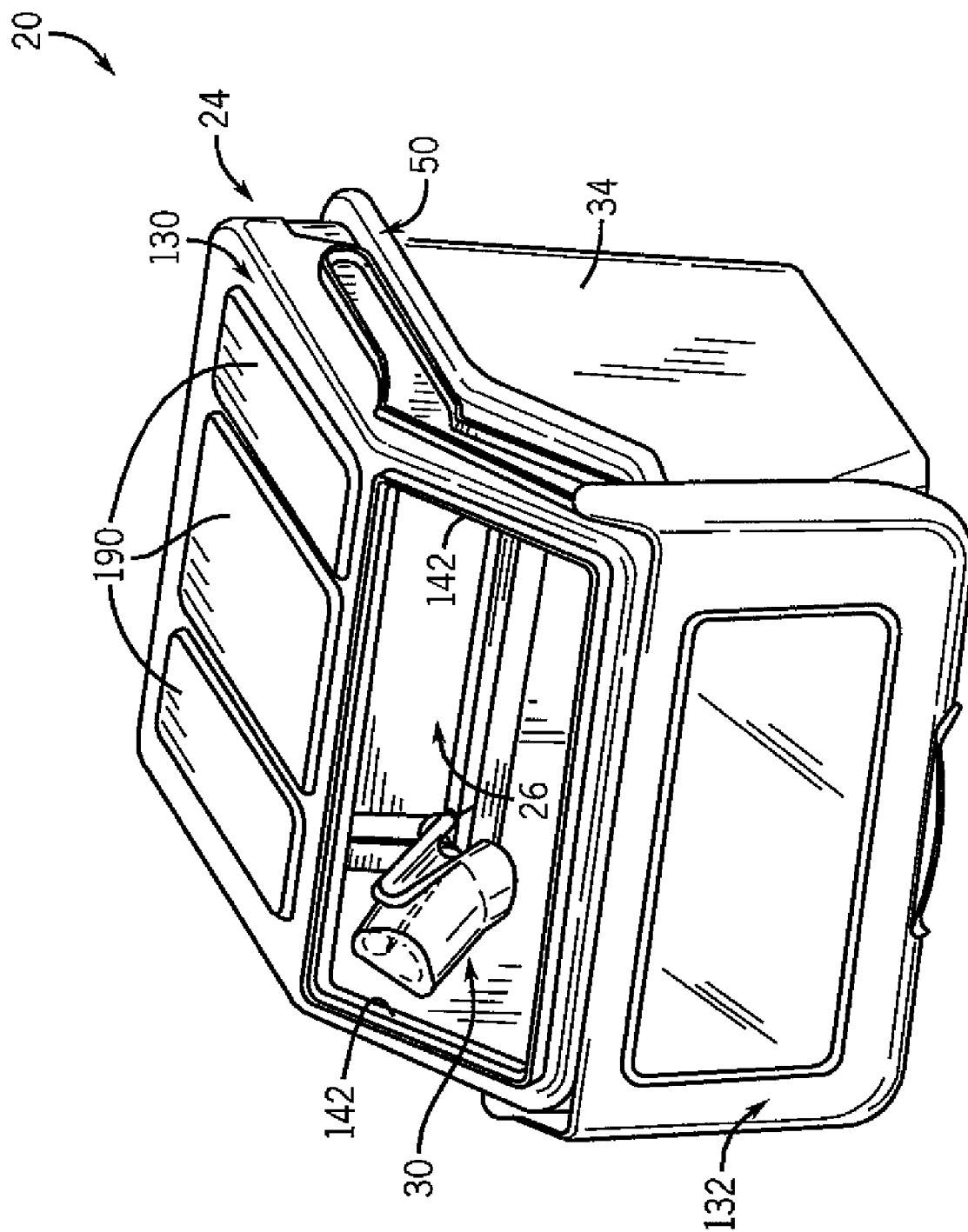
FIG. 11 shows the assembled storage bin of FIG. 2 with the cover in an optional front open position permitting access to the bin interior.

The construction of the disclosed lid assembly 24 permits the cover 132 to be moved between three optional positions. A closed position is shown in FIG. 2 where the cover 132 closes off the access opening 142. FIG. 10 shows the cover 130 moved to a first optional open position. To reach this position, the cover 132 is moved in a rearward direction to provide access to the opening 142. In this position, the cover 132 is positioned behind the access opening 142 and overlies the top panel section 134 of the base lid 130. FIG. 11 shows the cover 130 moved to a second optional open position. To reach this position, the cover 132 is moved in a forward direction to provide access to the opening 142. In this position, the cover 132 is positioned in front of and below the access opening 142 and yet permits full access through the opening into the interior storage space 70.

The transition region 172 on each of the tracks 160 permits the oval projection 186 to reorient as the cover 132 is moved from the angled position over the access opening to the generally horizontal position overlying the top panel section 134 of the base lid 130. As illustrated in FIG. 8, the width of the front track section 164, or in other words, the spacing between the ribs 162a and 162b increases moving closer to the closed front end 168 of the track 160. This wider spacing permits the oval projection 186 to rotate slightly within the track 160 to a position that is non-parallel to the orientation of the track. The cover 132 can then drop to the position in the second optional open position lying parallel to the front 38 of the container base side wall.

FIG. 8 illustrates the various positions and orientations of the oval projection 186. Position A represents the cover in the rearward first optional open position of FIG. 10. Position B represents the closed position of the cover 132 of FIG. 2. Position C represents the cover 132 in the second optional open position of FIG. 11. Position D represents the cover 132 within the transition regions 172 moving from position B to position D.

Figure 12:
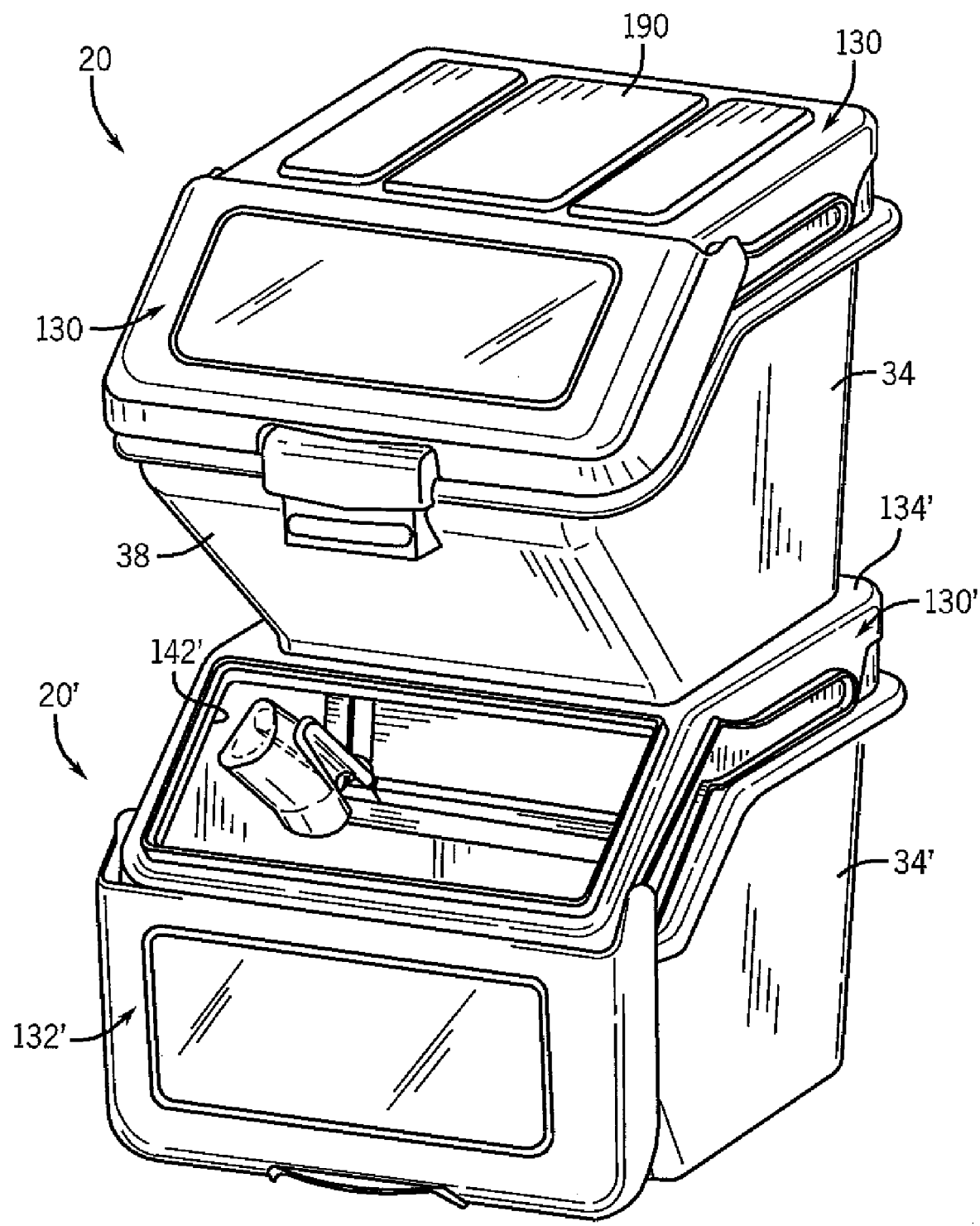
FIG. 12 shows two like storage bins identical to that shown in FIGS. 2 and 11 and in a vertically stacked configuration.

Turning now to FIG. 12, a pair of like storage bins 20 and 20' as described above are shown stacked vertically upon one another. The fronts 38 and 38' of each side wall on each container base 22 and 22' is angled forward moving up from the bottom 32 and 32', respectively. Thus, the bottom footprint of one container or bin 20 in the disclosed example is sized to rest upon the top panel section 134' of the lid of an adjacent lower container or bin 20'. The configuration of the container bases 20 and 20' and the lid assemblies 24 and 24' thus present the access opening 142' and the cover 132' of the lower bin for use, even in the stacked configuration as shown. The cover 132 and 132' of either bin 20 or 20' can open in a forward and dropped-down direction to expose the access opening 142 and 142', and can do so in the stacked configuration as shown in FIG. 12. As a result, the storage bins 20 as disclosed herein can be stacked in vertical arrangements with the like containers or bins 20' and yet any one of the lids can be opened and ingredients can be inserted or removed without breaking down the stack.

As shown in FIGS. 1, 2, and 12, for example, the top panels 134 and 134' of each base lid 130 and 130' can include upward bumped protrusions 190 and 190', or depressions, that mate with corresponding depressions (not shown), or bumps, to register the stacked container assemblies with one another. This can assist in stabilizing a stack of the containers.

As will be evident to those having ordinary skill in the art, features of the storage bin 20 disclosed herein can vary and yet fall within the spirit and scope of the present invention. In the disclosed example, the container base 22 is generally of a rectangular cylinder shape. The shape and configuration of the general container base and the lid form can vary from the rectangular cylinder shape and can be oval, circular, square, or other shapes. The materials utilized to fabricate the container base and lid assembly can also vary and can include plastic, metal, wood, or other suitable materials. The cover can include a transparent panel 192 (see FIG. 1) that allows a user to look into the storage bin without opening the cover 132 or removing the lid assembly 24. Other parts of the bin assembly can also be transparent, if desired. The tracks 160 can be formed in alternate manners from the projecting ribs as disclosed herein. For example, the tracks can be formed as depressions into the sides of the skirt on the base lid. Alternatively, the tracks can be provided as depressions in or ribs on an upper part of the side wall on the container base instead of as a part of the lid assembly. Further, the oval projections 186 can vary in shape and configuration as well. Multiple projections can also be utilized on each side of the lid assembly if desired.

In another example, the scoop and scoop hook can vary in configuration and construction from the examples shown and described herein. Similarly, the partition wall and clips can vary in configuration and construction and yet perform as intended. Either or both of these features can be eliminated from the bin 20 as well. Clearly, changes and modifications can be made to the disclosed example of a stackable storage bin within the spirit and scope of the present invention. The present invention is intended to encompass all such modifications and changes that fall within the scope of the appended claims.

Although certain storage bin and lid arrangements have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A storage bin assembly comprising:
   a container base having a front, a back, a bottom, a perimeter side wall extending up from the bottom, and a storage space above the bottom within the side wall;
   a base lid positioned over a top of the storage space;
   an access opening into the storage space positioned near the front of the container base; and
   a cover selectively movable relative to the lid between a closed position closing off the access opening and two optional open positions including a rear position rearward of the access opening and a front position forward of the access opening, wherein each optional open position exposes the storage space through the access opening,
   wherein the cover is generally horizontally oriented in the rear open position over a part of the base lid, and wherein the cover is generally vertically suspended below the access opening in the front open position.

2. A storage bin assembly according to claim 1, wherein the cover is slidable between the closed position and the two optional open positions.

3. A storage bin assembly according to claim 1, wherein the cover is slidable rearward to the rear open position and is slidable forward and downward to the front open position.

4. A storage bin assembly according to claim 1, wherein the base lid is removable from and replaceable on the container base.

5. A storage bin assembly according to claim 1, wherein the access opening is formed in the base lid.

6. A storage bin assembly according to claim 1, wherein the access opening is inclined from the front of the container base upward and rearward toward the back of the container base.

7. A storage bin assembly according to claim 1, further comprising:
   a partition wall suspended between the front and back and extending between opposed sides of the side wall, the partition having a bottom edge that is spaced upward from the bottom of the container base leaving a gap between the bottom edge and the bottom, wherein the partition wall is selectively removable from the container base.

8. A storage bin assembly according to claim 1, further comprising:

a slide track extending along and positioned on each side of the storage bin assembly; and a projection extending outward from each side of the cover, each projection slidably captured in a respective one of the tracks, wherein the cover is slidable between the closed position and the two optional open positions along the tracks.

9. A storage bin assembly according to claim 8, wherein one of the slide tracks is carried on each side of the base lid.

10. A storage bin assembly according to claim 1, wherein the partition wall has a pair of opposed side edges and an integral clip carried on each side edge, and wherein the integral clips are configured to suspend the partition wall from the perimeter side wall.

11. A storage bin assembly according to claim 10, wherein the base lid is removable from the perimeter side wall, wherein the access opening is in the base lid, and wherein the base lid fits over the perimeter side wall and the clips.

12. A storage bin assembly comprising:
a container base having a front, a back, a bottom, a perimeter side wall extending up from the bottom, and a storage space above the bottom within the side wall;
a base lid positioned over a top of the storage space;
an access opening into the storage space positioned near the front of the container base; and
a cover selectively movable relative to the lid between a closed position closing off the access opening and two optional open positions including a rear position rearward of the access opening and a front position forward of the access opening, wherein each optional open position exposes the storage space through the access opening,
wherein another like storage bin assembly can be stacked on top of the base lid of the storage bin assembly while the cover can be moved between the closed position and the forward open position exposing the access opening.

13. A stackable storage bin comprising:
a container base having a front, a back, a bottom, a perimeter side wall extending up from the bottom, and a storage space above the bottom within the side wall;
a lid positioned over a top of the storage space;
an access opening into the storage space positioned near the front of the container base; and
a cover selectively movable relative to the lid between a closed position closing off the access opening and an open position forward of the access opening,
wherein the lid of the container base is configured to accept a bottom of an adjacent like storage bin stacked on top of the container base while leaving the access opening and the cover exposed, and wherein the cover is suspended downward over the front of the container base when in the open position.

14. A stackable storage bin according to claim 13, wherein the cover is slidable between the closed position and the open position.

15. A stackable storage bin according to claim 13, wherein the cover is slidable along tracks positioned on opposite sides of the stackable storage bin.

16. A stackable storage bin according to claim 13, wherein the cover is movable to an alternate open position rearward of the access opening when no other storage bin is stacked on the stackable storage bin.

17. A stackable storage bin according to claim 13, wherein the access opening is inclined from the front of the container base upward and rearward toward the back of the container base.

18. A storage bin assembly comprising:
a container base having a front side, a rear side, a bottom, a perimeter side wall extending up from the bottom, and a storage space above the bottom within the side wall of the container base;
a lid positioned over a top of the storage space;
an access opening into the storage space positioned near the front of the container base;
a cover selectively movable relative to the lid between a closed position closing off the access opening and an open position exposing the access opening; and
a scoop having a handle and a receptacle, the scoop removably suspended within the storage space with the handle presented near the access opening for grasping,
wherein the cover is selectively movable between two optional open positions including a rear position rearward of the access opening and a front position forward and downward of the access opening.

19. A storage bin assembly according to claim 18, wherein the scoop has a generally flat side on a side opposite the handle, and wherein the generally flat side lies against the perimeter side wall of the container base when suspended.

20. A storage bin assembly according to claim 18, further comprising:
a hook clipped onto the perimeter side wall of the container base, wherein the scoop hangs from the hook when suspended.

21. A storage bin assembly according to claim 18, further comprising:
a removable partition wall suspended within the storage space between the front and the back of the container base, the partition wall having a bottom edge that is spaced upward from bottom of the container base.

* * * * *